United States Patent [19]

Hancock

[11] Patent Number: 4,958,844
[45] Date of Patent: Sep. 25, 1990

[54] LOAD BEARING STRUCTURAL MEMBER AND FRAME STRUCTURE

[75] Inventor: John P. Hancock, Egham, England
[73] Assignee: British Alcan Aluminium PLC, Buckinghamshire, England
[21] Appl. No.: 246,302
[22] PCT Filed: Feb. 10, 1987
[86] PCT No.: PCT/GB87/00100
§ 371 Date: Sep. 14, 1988
§ 102(e) Date: Sep. 14, 1988
[87] PCT Pub. No.: WO87/04679
PCT Pub. Date: Aug. 13, 1987

[30] Foreign Application Priority Data

Feb. 10, 1986 [GB] United Kingdom ............... 8603235

[51] Int. Cl.⁵ ............................................ B62D 21/02
[52] U.S. Cl. ................................. 280/185; 280/789; 280/797; 105/414; 296/181; 296/204
[58] Field of Search ............... 280/781, 785, 789, 795, 280/796, 797, 800; 52/730, 731, DIG. 7; 105/413, 414, 422; 296/181, 183, 204, 182

[56] References Cited

U.S. PATENT DOCUMENTS

| | | | |
|---|---|---|---|
| 1,846,567 | 2/1932 | Murray, Jr. | 280/796 |
| 3,420,192 | 1/1969 | Ellis | 105/422 |
| 3,962,015 | 6/1976 | Heimann | 296/181 X |
| 4,226,465 | 10/1980 | McCullough | 296/182 |
| 4,232,884 | 11/1980 | DeWitt | 280/785 |

FOREIGN PATENT DOCUMENTS

| | | | |
|---|---|---|---|
| 0043228 | 1/1982 | European Pat. Off. | |
| 0063214 | 10/1982 | European Pat. Off. | 105/422 |
| 963397 | 5/1957 | Fed. Rep. of Germany | |
| 3238481 | 4/1984 | Fed. Rep. of Germany | 296/181 |
| 2441530 | 6/1980 | France | |
| 2028960 | 3/1980 | United Kingdom | 296/181 |
| 2133752 | 8/1984 | United Kingdom | |

OTHER PUBLICATIONS

V. D. I. Nachrichten "Die Praxis des Metallklebens", Vol. 30, No. 24, Jun. 18, 1976, pp. 19–21.

*Primary Examiner*—Richard Bertsch
*Assistant Examiner*—Brian L. Johnson
*Attorney, Agent, or Firm*—Browdy and Neimark

[57] ABSTRACT

A load-bearing structural member (5, 6) comprising a least two hollow extrusions (12, 13) of light metal alloy each formed with two surfaces mated together with a layer of adhesive therebetween by relative linear movement of the extrusions in a single direction, the surfaces on one of the extrusions being formed on limbs (29) projecting therefrom and the angle between the mating surfaces and said direction being within the range 5° to 15°, the surfaces on the other extrusion terminating in shoulders (21) to be approached by the tips of the limbs (29) and a gap (75) to ensure that the layer of adhesive always extends between the shoulders (21) and the tips (74).

8 Claims, 5 Drawing Sheets

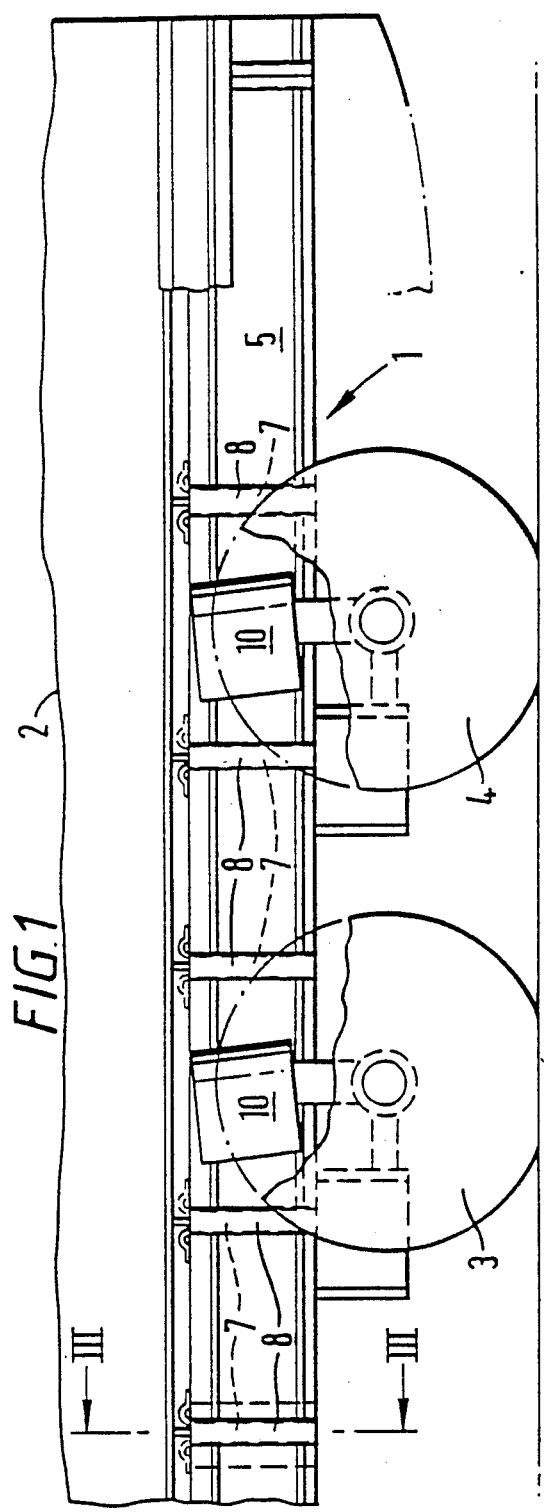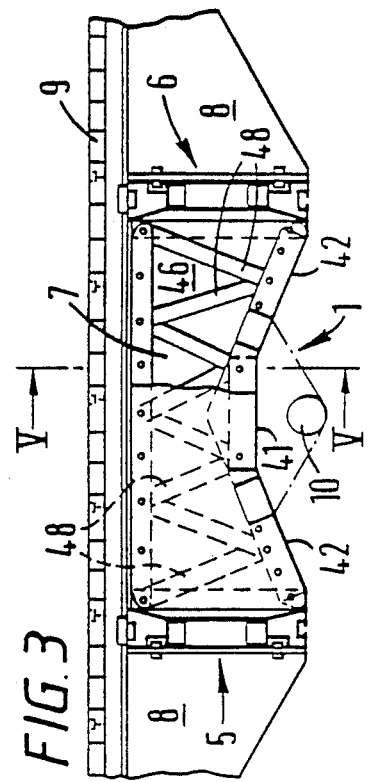

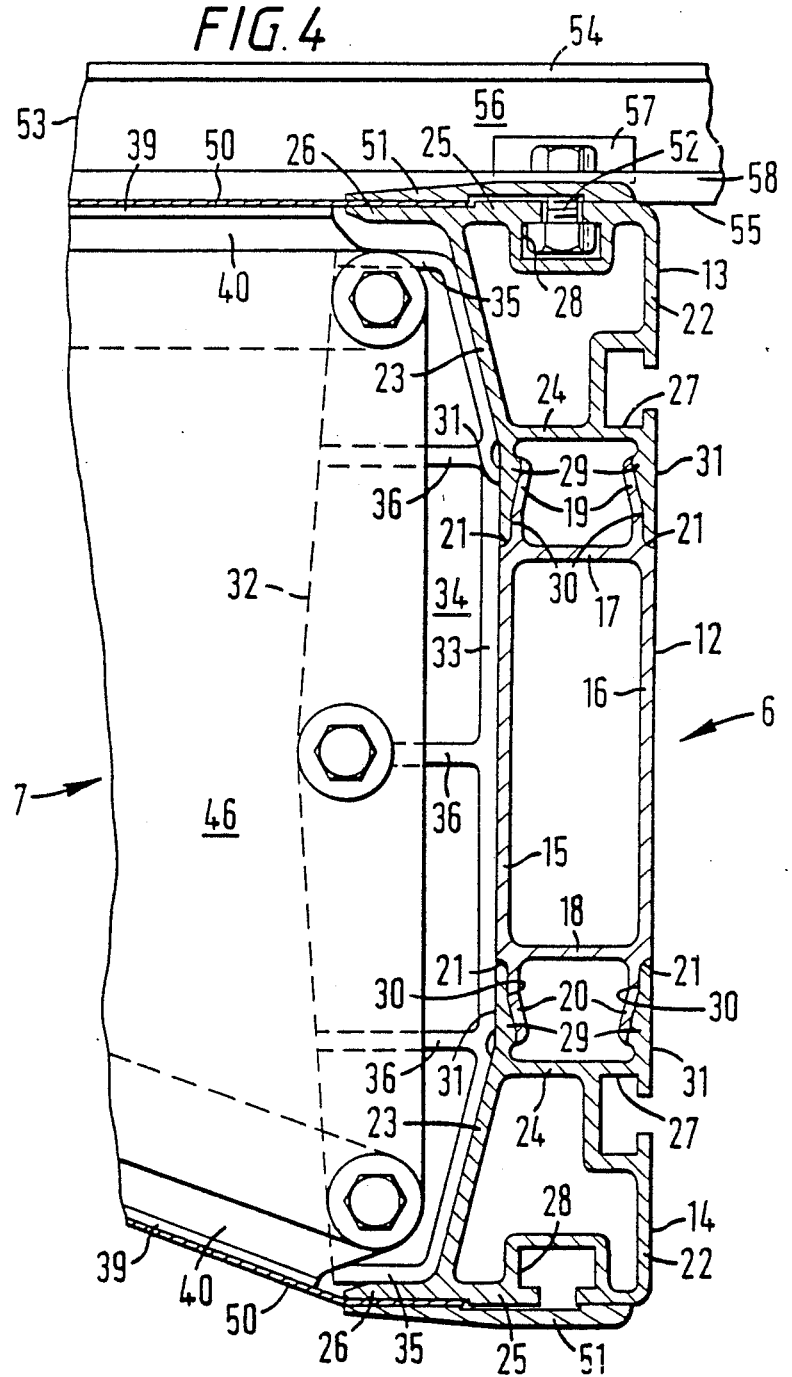

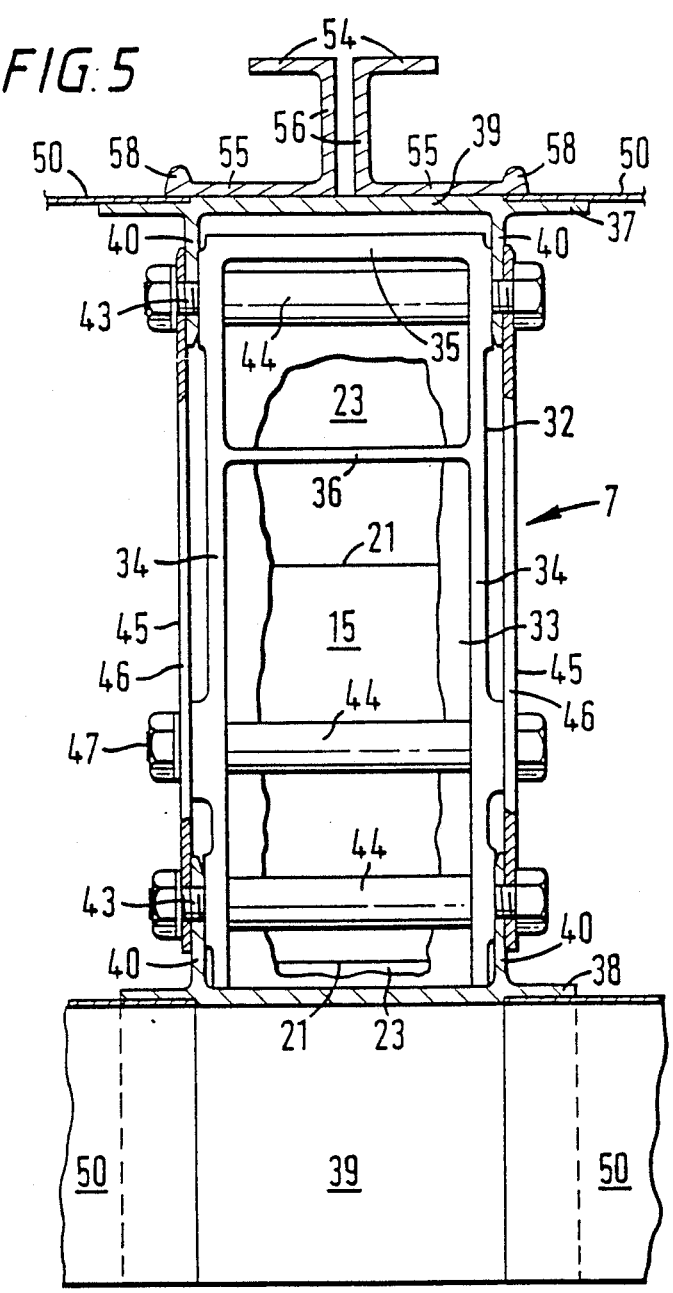

LOAD BEARING STRUCTURAL MEMBER AND FRAME STRUCTURE

BACKGROUND OF THE INVENTION

This invention relates to a load bearing structural member, a frame structure and a vehicle chassis.

Conventionally vehicle chassis for commercial vehicles are generally steel "ladder frame" constructions which are torsionally very flexible and reliance is placed upon this flexibility to contribute to the vehicle suspension. It has never proved commercially satisfactory to make such a chassis of light metal alloys such as aluminium alloys largely because fatigue problems generated at all the joints have been difficult to overcome. Nevertheless there is considerable pressure to make use of light metal and particularly aluminium alloys both in view of their greater corrosion resistance and also to save weight.

In recent years important developments have taken place in suspension systems particularly pneumatically operated systems, and these have now reached a point of design where it is beneficial to use a much more torsionally stiff chassis structure.

Thus a vehicle chassis can now be as rigid as it is possible to make it commensurate with other design constraints and it is an object of the present invention to provide an improved load bearing member of light metal such as an aluminium alloy; a frame structure incorporating two such members and a vehicle chassis comprising the frame structure.

SUMMARY OF THE INVENTION

According to one aspect of the present invention there is provided a load-bearing structural member comprising at least two hollow extrusions of light metal alloy each formed with two surfaces mated together with a layer of adhesive therebetween by relative linear movement of the extrusions in a single direction, the surfaces on one of the extrusions being formed on limbs projecting therefrom and the angle beetweem the mating surfaces and said direction being within the range 50° to 150°, the surfaces on the other extrusion terminating in shoulders to be approached by the tips of the limbs and means to ensure that the layer of adhesive always extends between the shoulders and the tips.

According to another aspect of the present invention there is provided a frame structure having at least two spaced apart side rails each comprising at least two hollow extrusions of light metal alloy formed with closely mating surfaces bonded together with an adhesive at least one of the members being formed with at least one extruded formation for receiving fasteners to be secured to other members.

According to a further aspect of the inventon there is provided a frame structure comprising a pair of spaced apart side rails of light metal alloy joined by a plurality of spaced apart box structures, each box structure having a pair of brackets supported by the side rails and comprising top and bottom walls secured to the brackets and side walls of sheet material reinforced at predetermined high stress locations with flexible tapes stuck thereto.

The frame structure of the immediately preceding two paragraphs preferably constitute vehicle chassis.

The above and other aspects of the invention will now be described by way of example with reference to the accompanying drawings in which:

BRIEF DESCRIPTION OF THE DRAWINGS

FIG. 1 is a side elevational view of part of a vehicle chassis;

FIG. 3 is a partial section on the line III—III of FIG. 1 to an enlarged scale;

FIG. 4 is a view of part of FIG. 3 to a further enlarged scale;

FIG. 5 is a section on the line V—V of FIG. 3 to the same scale as FIG. 4; and

DESCRIPTION OF THE PREFERRED EMBODIMENT (S)

Figure 2:
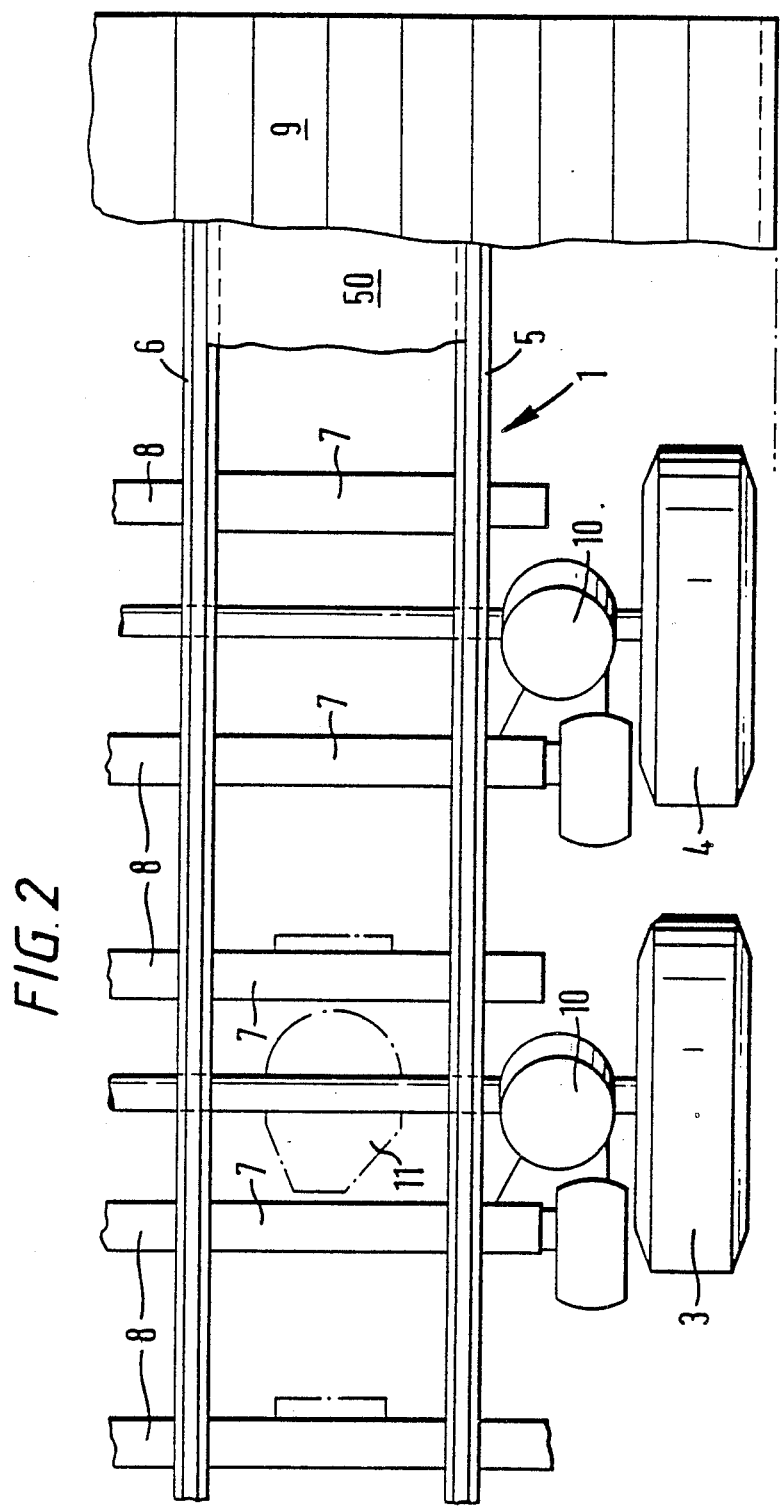
FIG. 2 is a plan view of the chassis of FIG. 1.

Referring to FIGS. 1 and 2 these show the rear end of a frame structure constituting a vehicle chassis 1 for a commercial vehicle having a body 2 and two pairs of wheels such as 3 and 4. The chassis comprises side rails 5 and 6 joined by cross-members 7. Outriggers 8 are carried by the chassis to support a floor 9 and the vehicle body 2. Appropriate cross members 7 carry parts 10 of the transmission system of the vehicle and different cross members support suspension elements, indicated generally at 11, for the wheels 3 and 4.

Referring now to FIGS. 3, 4 and 5 the chassis 1 is substantially wholly of aluminium alloy and the side rails 5 and 6 comprise three hollow extrusions; a central extrusion 12 and identical top and bottom extrusions 13 and 14.

The central extrusion 12 is rectangular in cross-section with side walls 15 and 16 and top and bottom walls 17 and 18. Outwardly of its end walls the extrusion 12 has upper and lower pairs of inwardly curved limbs 19 and 20. These limbs are set inwardly of the side walls to provide shoulders 21.

The top and bottom extrusions 13 and 14 are of box like formation having side walls 22 and 23 and end walls 24 and 25. The walls 25 are extended to provide flanges 26. Each side wall 22 and each end wall 25 is formed with a re-entrant slot 27, 28 to receive fasteners in conventional manner. The walls 22 and 23 are extended beyond the walls 24 to provide limbs 29 having internal surfaces 30 which closely embrace the outer surfaces of the limbs 19, 20. The outer surfaces 31 of the limbs 29 are aligend with the outer surfaces of the walls 15 and 16 of the central extrusion 12. The three extrusions are bonded together with a toughened single part epoxy adhesive such as that sold under the Registered Trademark PERMABOND as type ESP110. It will be understood that by providing the slots 27 and 28 other items, as will be described, may be secured to the rails without the stress-raising problems associated with hole drilling.

The cross members 7 are of mixed mechanical and bonded construction and are carried by heavy cast brackets such as 32 at each end thereof. The brackets 32 have base 33, side walls 34, end walls 35 and internal reinforcements 36. The brackets are secured to the rails by binding their bases 33 to the walls 23, 15 and 23 of the top, central and bottom extrusions 13, 12 and 14. Revetted connections (not shown) may also be provided since drilling the walls 23 and 15 does not significantly reduce the stress efficiency of the rails.

Opposed brackets 32 are joined at their upper and lower ends by "top hat" extrusions 37 and 38 (FIG. 5) each having a base 39 and upstanding wall 40 disposed inwardly of the side edges of the base. As shown in FIG. 3 the lower extrusion 38 has its walls 40 cut and the base 39 is bent to provide a central part 41 and inclined ends 42. The extrusions 37 and 38 are secured to the brackets 32 by bolts 43 passing through the walls 40. These bolts also pass through sleeves 44 having their ends extending into recesses (not shown) in the walls 34 to reduce stress in the cast brackets 32. The cross members 7 are provided with side walls 45 comprising sheets 46 held by the bolts 43 and by additional bolts such as 47 in the brackets 32.

As shown only in FIG. 3 the internal surfaces of the sheets 46 are reinforced by flexible tapes of woven plastics material 48 stuck to these internal surfaces. The tapes are shown in a generally lattice formation between additional bolts securing the sheets 46 to the walls 40 of the extrusions 37 and 38. However, in practice these tapes may be differently shaped and differently disposed depending upon the stress patterns shown to develop in the cross members 7 by a suitable computer program. Between each cross member 7 the chasis is enclosed by their monocoque skins or sheets 50 which are secured at their side edges to the rails 5 and 6 by extruded strips 51 held by bolts such as 52 engaged in the slots 28. The sheets 50 are also bonded to the bases 39 of the extrusions 38.

The arrangement so far described thus provides a very stiff chassis of monocoque construction having clean surfaces. The interior of the chassis, between the cross members 7 may be used to contain items such as fuel tanks, air reservoirs and spare wheels so that the vehicle has a physically and aerodynamically clean underside.

Pairs of floor support cross members 53 of —C— shape having upper and lower flanges 54 and 55 joined by walls 56 are arranged back to back with the walls 56 spaced apart across the upper extrusions 37. The cross members 53 extend beyond the rails 5 and 6 and secured thereto by clamps 57 held by bolts (not shown) in the slots 28 and engaged over protrusions 58 on the flanges 55. The outriggers 8 are formed of two sheets of material extending between and secured to the cross members 53 and formed with flanges secured by bolts in the slots 27. The floor planks 9 are conventionally secured to the cross members 53. It will be understood that this floor construction further contributes to the stiffness of the chassis.

The forward end of the chassis (not shown) has an additional structure alongside and underneath it to integrate with the front suspension mounting assembly and assist in accepting braking loads. This structure would also be designed to compensate for loss of strength to the chassis at the points where the monocoque skins 50 are discontinued around the rear of the engine and gearbox. Large flat plates are attached across the outer faces of the structure on each side, extending above it to the full chassis depth and bolted to the side rails 5 and 6 via the —T— slots 27. These plates may, in fact, be plate-like assemblies built up from several laminations of thinner plate and having the central areas of some layers removed to save weight. Also, to avoid a forming operation, a suitably designed flange section could be attached to the plate structure to stiffen the edge.

Although the frame structure described above is in the form of a vehicle chassis it could be employed for many other load carrying purposes where lightness and a particularly "stiff" configuration are required.

Figure 6:
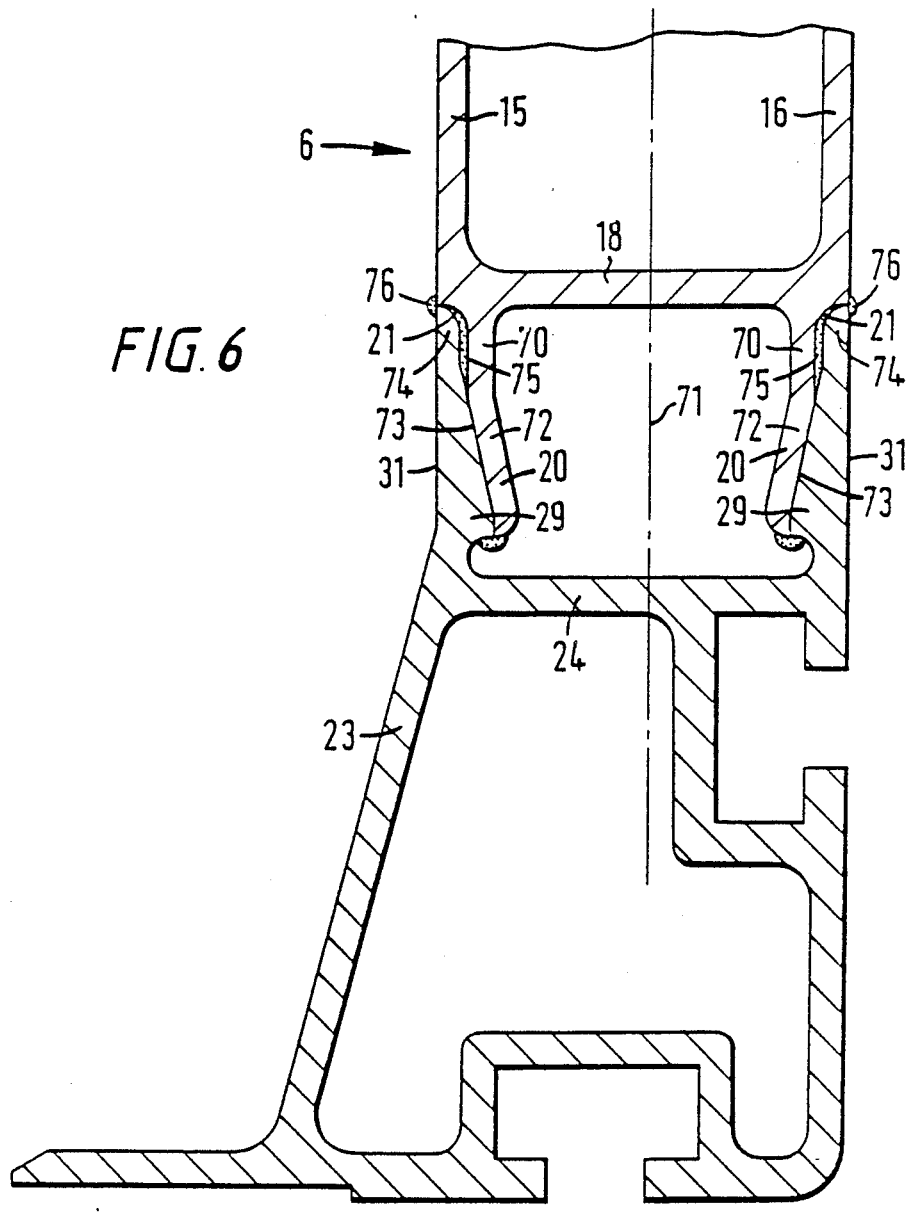
FIG. 6 is a view to an enlarged scale of a detail of FIG. 4.

Furthermore the present invention extends to the provision of load bearing structural members such as the side rails 5 and 6. Referring to FIG. 6 it will be seen that the limbs 20 are of constant width; have roots 70 extending parallel with the axis 71 of the extrusion 6 and inwardly inclined parts 72, the outer surfaces 73 of which are inclined at an angle of 12.5° to the axis 71. The limbs 29, adjacent their tips 74, extend parallel with the roots 70 but are spaced therefrom by gaps 75. The remainder of the inner surfaces of the limbs 29 are inclined to the axis 71 at 12.5° to mate with the parts 72.

This configuration ensures that when adhesive is applied to the mating surfaces of the limbs and the latter are moved together parallel with the axis 71 the space 75 becomes filled with adhesive which squeezes out as at 76 so ensuring that the small gap between the tips 74 and the shoulders 21 contains adhesive.

This is important in order to provide consistent high strength to the joint since as the load bearing member is flexed the joint tends to fail by the "peeling" of the tips 74 away from the roots 70. This "peeling" action is a special form of tensile stress and in the absence of adhesive around the tip would weaken the joint.

The chosen angle of 12.5° is a compromise between what is believed most desirable (probably about 7°) and what is possible within acceptable extrusion tolerances. If extrusion techniques improve or if larger units are required then a smaller angle would be possible. It is believed that an angle less than 5° would be disadvantageous and that an angle above 15° would be unlikely to present any advantage.

I claim:

1. A load bearing member comprising at least first and second hollow extrusions of light metal alloy, a pair of limbs having tips thereon projecting from said first extrusion and each having a first, inner surface thereon, said second extrusion having at least one part to extend between said limbs which part has a pair of second outer surfaces thereon to engage said first surfaces, inner ends of each of said second surfaces terminating in an outwardly directed shoulder, the respective first and second surfaces being mated together with a layer of adhesive therebetween, said mating ocurring by relative linear movement of the extrusions in a single direction until the tips approach the shoulders at an angle between each pair of mated surfaces and said single direction of 5° to 15°, and means for ensuring that the layer of adhesive extends between the shoulders and the tips wherein said means for ensuring comprises at least one of each pair of mating surfaces formed with a recess communicating with a space between the associated shoulder and tip to ensure that the relative movement of extrusions in said single direction forces adhesive from the recess through the space.

2. A pair of members according to claim 1 arranged as spaced apart side rails of a frame structure, at least one of the members being formed with at least one extruded formation for receiving fasteners to be secured to the other member.

3. A pair of members according to claim 2 in which each side rail member has three hollow extrusions; a central symmetrical extrusion and a pair of identical top and bottom extrusions bonded to opposite ends of the central extrusion.

4. A pair of members according to claim 3 in which the extruded formation comprise re-entrant slots and defined only in the top and bottom extrusions.

5. A frame structure incorporating a pair of members according to claim 2 in which the side rial members are linked by spaced apart cross members of a stiff box formation having walls extending between brackets bonded to the side rails.

6. A frame structure according to claim 5 in which the walls of the box formation are internally stiffened by flexible tapes stuck to the walls of the box formation at predetemined high stress locations.

7. A frame structure according to claim 6 in which the side rails have upper and lower surfaces and the upper and lower surfaces of the side rails are joined by sheet material. between the box structures to provide a monocoque construction.

8. A frame structure according to claim 5 comprising a vehicle chassis.

* * * * *